No. 677,617. Patented July 2, 1901.
L. FRIEDMANN.
LUBRICATING PUMP.
(Application filed Aug. 1, 1899.)
(No Model.)

Witnesses:
Wilhelm Müller.
Rudolf Treichel.

Inventor
Louis Friedmann
per
Richard Neumann
Attorney.

THE NORRIS PETERS CO., PHOTO-LITHO., WASHINGTON, D. C.

UNITED STATES PATENT OFFICE.

LOUIS FRIEDMANN, OF VIENNA, AUSTRIA-HUNGARY.

LUBRICATING-PUMP.

SPECIFICATION forming part of Letters Patent No. 677,617, dated July 2, 1901.

Application filed August 1, 1899. Serial No. 725,805. (No model.)

*To all whom it may concern:*

Be it known that I, LOUIS FRIEDMANN, a subject of the Emperor of Austria-Hungary, residing at Vienna, in the Empire of Austria-Hungary, have invented Improvements in Lubricating-Pumps, of which the following is a specification.

This invention relates to a lubricating-pump by means of which a uniform and reliable lubrication of the parts to be lubricated can be effected because the accumulation of air or gas in the piston-chamber is entirely prevented. This lubricating-pump is characterized by the fact that the gearing actuating the plunger-piston, together with the distributing rotating disk, is arranged in the chamber below the oil vessel, and the said rotating disk occupies the uppermost part of the chamber. The plunger moves in an aperture bored in the chamber, which is made air-tight toward the exterior by means of a stuffing-box. It is removably connected to that part of the gearing which serves to drive it, and it is accessible from the outside, and therefore can be removed or exchanged without it being necessary to disconnect any other part of the lubricating-pump.

The accompanying drawings illustrate a lubricating-pump of this kind.

Figure 1:
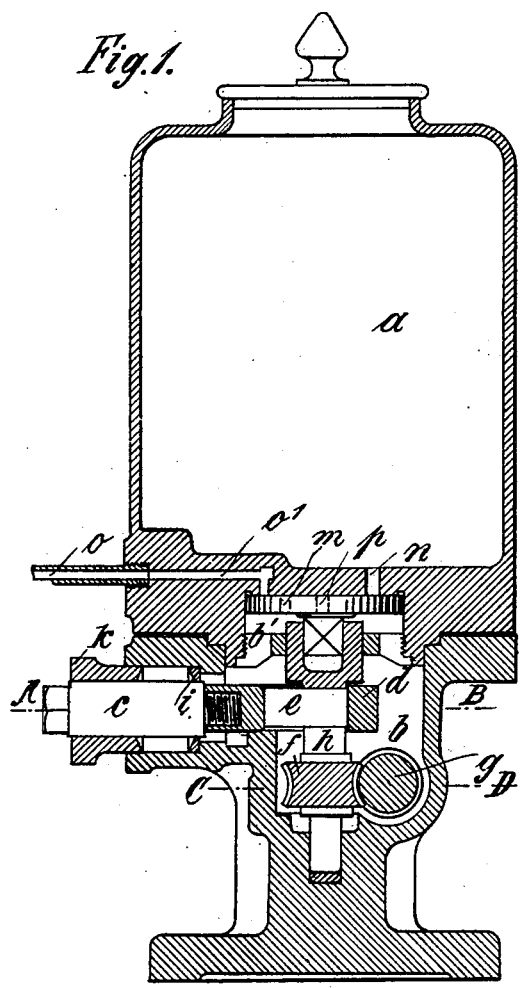
Figure 2:
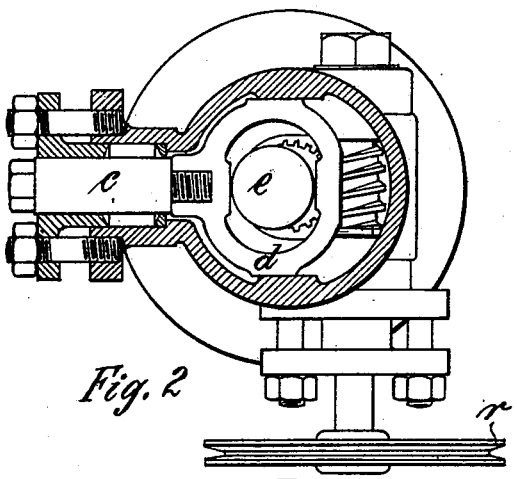
Figure 3:
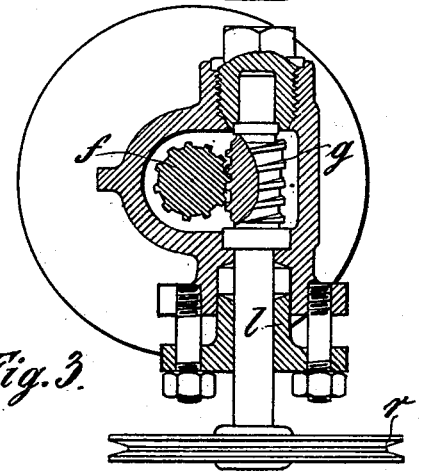
Figure 4:
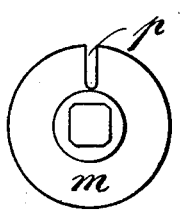
Figure 5:
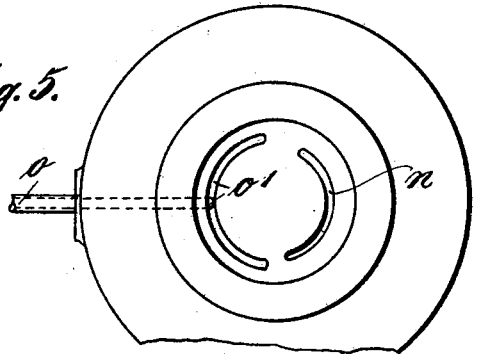

Figure 1 is a vertical longitudinal section through the same. Fig. 2 is a horizontal section on the line A B of Fig. 1, and Fig. 3 is a similar section on the line C D of Fig. 1. Fig. 4 is an under-side view of the distributing rotating disk. Fig. 5 is an under-side view of the oil vessel.

$a$ is the oil vessel, which has in its bottom an arc-shaped slot $n$ and an arc-shaped groove $o'$, which is connected to the oil-supply pipe $o$ and is open in its lower part. The arc-shaped slot $n$ connects the oil vessel $a$ with the underlying pump-chamber $b\,b'$, which has a lateral hole in which works a piston $c$, that is made tight by means of a stuffing-box $k$. The piston is screwed at its inner end to an eccentric $d$, which surrounds the eccentric $e$, that is fixed on the vertical shaft $h$. On the shaft $h$ is fixed a worm-wheel $f$, in which engages the worm $g$. The worm-shaft is mounted in bearings in the casing, is made tight toward the outside by means of a stuffing-box $l$, and carries outside of the casing the driving-pulley $r$, which is driven in a well-known manner. The shaft $h$ carries on its upper end the distributing rotating disk $m$, which is provided with a radial slot $p$ and occupies the uppermost part of the pump-chamber $b\,b'$, making a tight joint with the horizontal partition that contains the ports $n$ and $o'$. The pipe $o$ leads to the part of the machinery to be lubricated, which may, for example, be the cylinder or the valve-chest of a steam-engine, and it may be provided with a check-valve, which prevents steam or any other fluid under pressure from entering the pump-chamber $b\,b'$.

The action of the pump is as follows: By the rotation of the pulley $r$ the shaft $h$ is rotated by the worm $g$ and wheel $f$. The eccentric $e$ imparts to the eccentric $d$, and with it also to the plunger-piston $c$, a to-and-fro movement while the rotating disk $m$ rotates. During the inward movement of the plunger the slot $p$ of the rotating disk $m$ moves along the arc-shaped slot $o'$, and thus connects the pump-chamber with the delivery-pipe $o$. During the outward movement of the piston the slot $p$ of the rotating disk $m$ puts the oil vessel $a$ in communication with the pump-chamber. By this means at every revolution of the eccentric $e$ a certain amount of oil is forced into the pipe $o$, and an equal amount of oil flows from the vessel into the pump-chamber.

If through any accident air or steam should enter the pump-chamber, this gaseous fluid can escape at each suction-stroke of the plunger-piston through the passage $n$ into the oil vessel, and it cannot therefore interfere in any way with the operation of the pump. As in this arrangement the gearing which drives the piston and the rotating disk are working within the chamber containing oil, these parts do not require further lubrication. Both of the stuffing-boxes $l$ and $k$ are accessible from the outside, and can therefore be readily adjusted.

The plunger can be detached and removed by screwing it out of the eccentric $d$ without it being necessary to disconnect any other part of the pump. If the piston is to be replaced by another piston of larger or smaller area for the purpose of delivering a greater or smaller quantity of oil at each stroke, then it is merely necessary to replace the stuffing-box gland k and the washer i at the bottom.

I claim—

1. In combination with an oil-reservoir, a pump-chamber beneath the same, a shaft in said chamber, an intermeshing worm and wheel for rotating the shaft, an eccentric on the shaft, an eccentric-strap surrounding the eccentric, a pump-piston connected to the eccentric-strap, an outlet-port from the reservoir, a duct communicating with a delivery-pipe, a rotating slotted disk in the uppermost part of the pump-chamber connected to the eccentric-shaft whereby the pump-chamber is alternately brought into communication with the oil-reservoir and the delivery-pipe, substantially as described.

2. In combination with an oil-reservoir, a pump-chamber and shaft provided with an eccentric driven from the outside, a slotted disk on said shaft, an eccentric-strap surrounding the eccentric, a pump-piston screwed into said eccentric-strap, and a stuffing-box in the lateral bore of the side of the pump-chamber through which the piston operates so as to permit its detachment from and replacement on said eccentric-strap without necessitating the removal of any other parts of the pump, substantially as described.

In witness whereof I have hereunto set my hand in presence of two witnesses.

LOUIS FRIEDMANN.

Witnesses:
 ALVESTO S. HOGUE,
 AUGUST FUGGER.